Oct. 2, 1962  L. R. GURIN  3,056,204
ORTHODONTIC DEVICE
Filed April 6, 1959

INVENTOR
Lawrence R. Gurin
BY
*Ammand E. Rackenbach*
ATTORNEY

United States Patent Office 3,056,204
Patented Oct. 2, 1962

3,056,204
ORTHODONTIC DEVICE
Lawrence R. Gurin, Pheasant Drive, Armonk, N.Y.
Filed Apr. 6, 1959, Ser. No. 804,458
3 Claims. (Cl. 32—14)

This invention relates to an orthodontic bracket and more particularly to an orthodontic device adaptable to be used with a variety of orthodontic brackets.

In the general technique of orthodontics, corrective forces varying in magnitude and direction, depending upon the degree and nature of the misalignment of a tooth from the general arch line of the teeth, is applied to an individual tooth in the treatment of malocclusion.

In the major correctional movements to which teeth may be subjected during such treatment, the corrective forces should be sufficient to accomplish the desired movement but not so great as to cause loosening of the teeth from their sockets or resorption of the root tips of the teeth.

The basic therapeutic device in the practice of orthodontics consists of a tooth band cemented to a tooth, an arch wire in varying dimensions and shapes, seated in the receiving slot of a bracket which is secured to, or part of the tooth band, and ligature wires which when tied so as to distort the flexible arch wire to, and secure it in, the bracket slot causes the necessary forces to be transmitted to the tooth. Each of the components of such device render an individual and distinctive force varying in magnitude and direction depending upon their size, shape and dimensional variation.

Thus, where a rotative movement of a tooth around its long axis is necessary, the degree of torque supplied by the use of a bracket is often insufficient. In order to increase the torque, a time consuming and delicate procedure of manually attaching one or more eyelets or staples to either side of the central axis of the band is required. Quite frequently, when a ligature wire is then passed through such eyelet or staple and tied to the arch wire to create the desired torque, the band is pulled away from its cemented seal to the tooth, and necessitates repeating the operation. Where, on the other hand, the band is pulled from the tooth after a patient leaves the dentist's office, and such separation goes unnoticed, decalcification of the tooth will probably follow.

The use of the wide bracket, rather than a narrow bracket, in order to increase the ability to rotate the tooth about its long axis, frequently causes an excessive force in other types of movements to be applied to the tooth thereby causing pain and loosening and resorbtion of the root of the tooth. In addition, the wider bracket makes placement of the band around the tooth, which is crowded by adjacent teeth, extremely difficult and in some cases impossible. The wide bracket additionally presents more surface area to catch overflow cement; more surface area to interfere with cusps of the opposite jaw, and more surface area to catch food particles. The wide bracket further makes placement of the arch wire in the slot and use of the ligature wire more difficult.

The use of a narrow bracket, although permitting use of a lesser number of wires of consecutively increasing diameter than would be used with a wider bracket thereby saving the orthodontist time and effort, cannot, as heretofore pointed out, supply the desired nor required torquing force around the long axis of a tooth.

It becomes apparent that an ideal orthodontic bracket is one which is relatively narrow yet which will permit effective rotational movements about the long axis of the tooth without use of eyelets or staples.

It is the object of this invention to provide an orthodontic bracket which permits maximum mechanical advantages for rotation around the long axis of the tooth without the need of additional attachments.

Another object of this invention is to provide an orthodontic bracket adaptable for three dimensional control over tooth movement and usable with whatever combination of arch wire or other attachment is necessary in the alignment and/or positioning of teeth.

Another object is the provision of an orthodontic bracket suitable for use in universal applications in the various techniques of orthodontics.

A further object of this invention is the provision of an orthodontic device which gives an adjustable degree of torque without causing tooth damage and which may be used with any standard orthodontic bracket.

Still a further object of the present invention is to provide an orthodontic device which will permit the application of the needed torque in the treatment of malocclusion without the need of adding auxiliary rotating devices.

A further object of the invention is the provision of a bracket easily applied and adaptable to any shaped tooth which will minimize interference with the cusps of opposing teeth; be relatively comfortable to the wearer, and minimize friction between the arch wire and the bracket.

In order to accomplish the foregoing objects and advantages, there is provided a tooth band having a bracket vertically mounted thereon and provided with at least one groove to receive at least one arch wire. There is further provided a pair of arms laterally extending from the base of the bracket which arms contain a plurality of transverse channels on the undersurface thereof, so that ligature wires may be easily negotiated therethrough in order to furnish a controlled and desired amount of torque around the long axis of the tooth when tied to the arch wire.

Other and further objects, advantages, and inventive characteristics of this new and unique structure will become apparent to those versed in the art from the following description of a particular embodiment of this invention as illustrated in the drawing in which.

Figure 1:
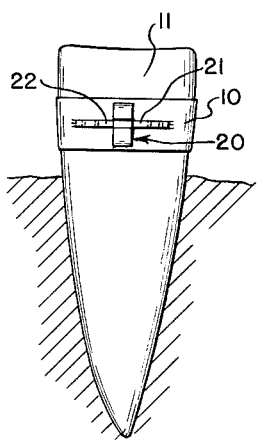
FIG. 1 is a front elevational view of the orthodontic device of the present invention applied to a tooth.

Referring now to the drawing, there is illustrated in FIG. 1 a tooth band 10 of relatively medium width, secured to a tooth 11 by cementing or jacketing, and a bracket 20 including rotation arms 21, 22 secured to the band 10.

A bracket 20, of orthodontic dimensions, which may assume an arcuate shape in conformity with the general shape of an average tooth, or may be on a relatively flat plane as illustrated, is affixed to and substantially overlays the band 10 on a lateral plane. The bracket 20 comprises a central projecting portion 30 having a longitudinal groove 40 on its outer surface medially thereon extending perpendicular to the long axis of said portion and parallel to the plane of the band 10. The floor 41 of said groove 40 extends downward sufficiently through the height of the projecting portion 30 of said bracket so that it may receive an arch wire of orthodontic dimensions, but is not so deep as to extend to the base portion 31 of said bracket. Projecting outwardly along the outer surface and beyond the end edges of the projecting base 30 are oppositely disposed flanges 42, 43, such flanges being undercut to serve as receiving flanges whereby a ligature wire 51 may be tied therearound to retain an arch wire 52 placed in the receiving groove 40.

Extending equidistant from opposite sides of the projecting portion 30 of the bracket are a pair of rotation arms 21, 22 which are a lateral extension of the base 31 of the bracket 20. Such arms 21, 22 are coextensive with and substantially overlying the tooth band 10. The undersurface of said rotation arms 21, 22 lying flush with one surface of the tooth band 10, have a plurality of channels 32, 33, 34 and 35 transverse thereto on either side of the projecting portion 30 of the bracket 20 and serve to receive the ligature wires which may be necessary to rotate the teeth.

Figure 2:
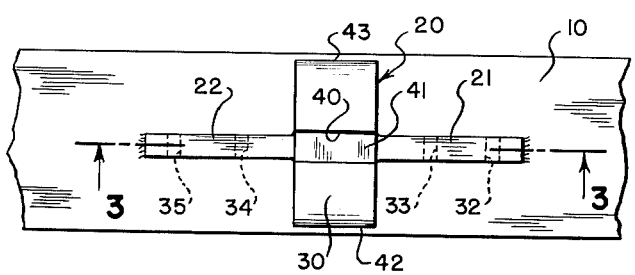
FIG. 2 is a plan view showing the bracket and rotation arms mounted on a tooth band.
Figure 3:
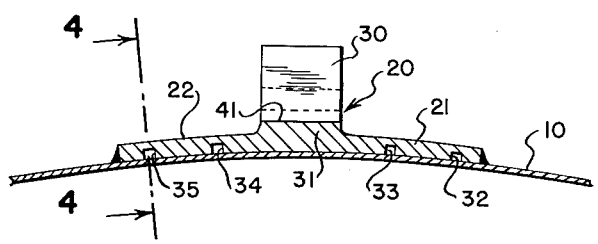
FIG. 3 is a sectional view taken on line 3—3 of FIG. 2.

As has heretofore been noted, such arms 21, 22 may be an integral part of the base 31 of the bracket 20, as seen in FIGS. 2 and 3, with said channels 32, 33, 34 and 35 drilled at right angles to the long axis of said arms, or may be separately milled and attached to the bracket by affixing means.

Where the requirements for affixing the bracket 20, including arms 21 and 22 to the tooth band 10 depend upon a thickness of similar magnitude to said band 10, as for example, in the use of stainless steel where welding the two surfaces are necessary, there is provided flanges 75, 76 intermediate between the base of the bracket 31 and arms 21, 22. Such flanges 75, 76 are a lateral extension of the base of bracket 20 with arms 21, 22 a further lateral extension of said flanges 75, 76, although comparatively narrower in width than said flanges.

Figure 6:
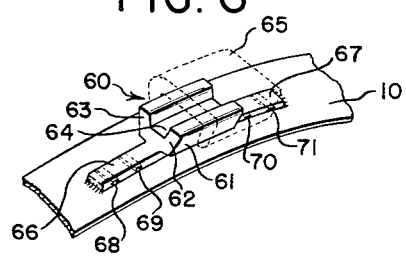
FIG. 6 is a prospective view of a further type of orthodontic bracket shown with rotation arms.
Figure 7:
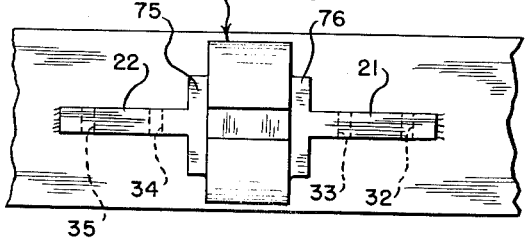
FIG. 7 is an orthodontic bracket shown with rotation arms and provided with flanges for use in attaching the bracket to a tooth band where required.

By way of illustration, there is shown in FIG. 6 a further type of bracket 60 used in orthodontic practice, incorporating the use of rotation arms therewith. Bracket 60 shown mounted on a tooth band 10 comprises an elongated base 61 and outwardly projecting sides 62, 63 to form a lateral channel 64 adapted to receive an arch wire. A cap 65 with inwardly inclined sides, coextensive with outwardly projecting sides 62, 63 is adapted to slide over channel 64 and retain an arch wire therein. Arms 66, 67, forming a lateral extension of and extending equidistant from opposite ends of elongated base 61, are adapted to lie flush with one surface of tooth band 10. A plurality of channels 68, 69 in one arm 66 and a plurality of channels 70, 71 in arm 67 are drilled at right angles to the long axis of such arms.

Although a pair of channels 32, 33 and 34, 35 in FIG. 3, and channels 68, 69 and 70, 71 as in FIG. 6, are shown on each side of the projecting portion of the respective brackets 20 and 60, it is the intention herein that at least one channel be used on either side thereof and within each arm. Although the rotation arms 21, 22 and 66, 67 are shown to be used with but two types of orthodontic brackets, it is within the ambit of my invention to utilize said arms with any type of orthodontic bracket. It is further within the ambit of this invention that at least one of said rotation arms be utilized with an orthodontic bracket, and where a plurality of arms are utilized, said arms extending from the central projecting portion of a bracket may be of equal as well as unequal length.

Figure 5:
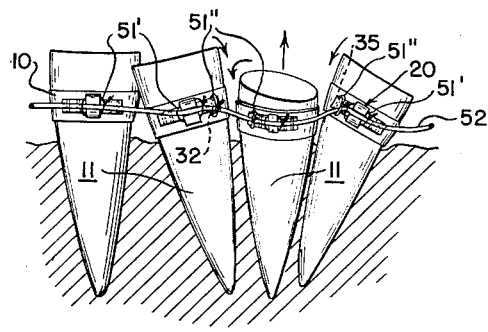
FIG. 5 is an enlarged view exemplifying the principle of operation of the present invention.
Figure 4:
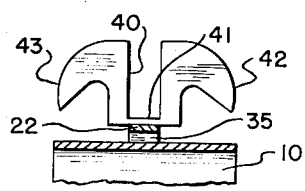
FIG. 4 is a transverse sectional view taken on line 4—4 of FIG. 3.

In the practice of this invention as shown in FIG. 5 a tooth band 10 is affixed to the tooth 11 needing correction, by cementing or other means. Corrective pressures are placed on the tooth by placing an arch wire 52 bent in the general arch line of the teeth in or close to the slots of the brackets 20 and tying a ligature wire 51′ passing around flanges 42, 43 and over the arch wire 52. However, if teeth are rotated along their long axis out of alignment, other ligature wires 51″ are passed through the channels 32, 35 of arms 21, 22 which are furthest away from the arch wire 52 and said ligatures 51″ are tied as tightly as necessary to the arch wire, thus creating the necessary torque to unrotate those teeth which are so tied.

I claim:

1. A bracket for orthodontic use comprising a substantially elongated central portion adapted to be mounted parallel to the long axis of a tooth and having a lateral groove in the outer face thereof adapted to receive an arch wire, the edges of said groove projecting outwardly beyond the end edges of said central portion to serve as receiving flanges for a ligature wire, and a pair of arms extending from opposite sides of said central portion substantially in alignment with said lateral groove; the inner face of each of said arms having at least one ligating channel extending transversely thereacross at a point spaced from the junction of said arm with said central portion.

2. A bracket for orthodontic use comprising a substantially elongated central portion adapted to be mounted parallel to the long axis of a tooth and having a lateral groove in the outer face thereof adapted to receive an archwire, and a pair of arms extending from opposite sides of said central portion substantially in alignment with said lateral groove; the inner face of each of said arms having at least one ligating channel extending transversely thereacross at a point spaced from the junction of said arm with said central portion.

3. A bracket for orthodontic use comprising a substantially elongated central portion adapted to be mounted parallel to the long axis of a tooth and having a lateral groove in the outer face thereof adapted to receive an arch wire, and a pair of arms extending from opposite sides of said central portion substantially in alignment with said lateral groove; the inner face of each of said arms having at least one ligating channel extending transversely thereacross at a point spaced from the junction of said arm with said central portion; and a cap coextensive with said central portion and seated thereover.

References Cited in the file of this patent

UNITED STATES PATENTS

| | | |
|---|---|---|
| 1,952,320 | Johnson | Mar. 27, 1934 |
| 2,230,315 | Winslow | Feb. 4, 1941 |
| 2,494,540 | Brusse | Jan. 17, 1950 |
| 2,701,913 | Lane | Feb. 15, 1955 |
| 2,756,502 | Bowles | July 31, 1956 |
| 2,908,974 | Stifter | Oct. 20, 1959 |